(12) United States Patent
Wallis

(10) Patent No.: US 9,231,481 B2
(45) Date of Patent: Jan. 5, 2016

(54) POWER CONVERTER APPARATUS

(71) Applicant: MOTOROLA SOLUTIONS, INC, Schaumburg, IL (US)

(72) Inventor: David W Wallis, Atlanta, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 294 days.

(21) Appl. No.: 13/871,748

(22) Filed: Apr. 26, 2013

(65) Prior Publication Data

US 2014/0320086 A1  Oct. 30, 2014

(51) Int. Cl.
| | |
|---|---|
| *H02M 3/335* | (2006.01) |
| *H02J 7/00* | (2006.01) |
| *H02J 7/04* | (2006.01) |
| *H02M 1/14* | (2006.01) |
| *H02M 1/44* | (2007.01) |
| *H02M 1/00* | (2007.01) |

(52) U.S. Cl.
CPC ......... *H02M 3/33507* (2013.01); *H02J 7/0044* (2013.01); *H02J 7/04* (2013.01); *H02M 1/14* (2013.01); *H02M 1/44* (2013.01); *H02M 2001/0029* (2013.01)

(58) Field of Classification Search
CPC .............. H02M 1/44; H02M 3/33507; H02M 2001/0029
USPC ................ 320/139, 140, 141, 145; 363/21.18
See application file for complete search history.

(56) References Cited

U.S. PATENT DOCUMENTS

| | | | |
|---|---|---|---|
| 4,208,706 A * | 6/1980 | Suzuki et al. | .................... 363/26 |
| 6,344,986 B1 * | 2/2002 | Jain | ...................... H02M 1/4225 |
| | | | 363/21.12 |
| 7,449,874 B2 | 11/2008 | Seliverstov | |
| 7,884,590 B2 | 2/2011 | Liu | |
| 7,977,921 B2 * | 7/2011 | Bahai et al. | .................... 320/140 |
| 8,258,768 B2 | 9/2012 | McPhalen et al. | |
| 8,278,998 B2 | 10/2012 | Kajita | |

(Continued)

FOREIGN PATENT DOCUMENTS

| | | | |
|---|---|---|---|
| WO | 2007120602 A2 | 10/2007 | |
| WO | 0221670 A1 | 3/2012 | |

OTHER PUBLICATIONS

Corresponding International Application No. PCT/US2014/035133—International Search Report with Written Opinion—mailing Date Jul. 15, 2014.

(Continued)

*Primary Examiner* — Yalkew Fantu
*Assistant Examiner* — Manuel Hernandez
(74) *Attorney, Agent, or Firm* — Barbara R. Doutre

(57) ABSTRACT

A power converter having reduced switching transients includes a conversion inductance, a pulse width modulation (PWM) controller, a conversion inductance, and a switch transistor. A low pass filter is connected between the PWM controller and the switch transistor to filter a PWM signal produced by the PWM controller and produce a filtered PWM signal. The switching transistor switches current through the conversion inductance responsive to the filtered PWM signal. The low pass filter filters out harmonic content of the PWM signal that is above the fundamental frequency in a way that maintains most of the harmonic content of the PWM signal to substantially eliminate higher harmonic elements which are conventionally responsible for transients across the conversion inductance.

29 Claims, 5 Drawing Sheets

(56) References Cited

U.S. PATENT DOCUMENTS

| | | |
|---|---|---|
| 2006/0097711 A1* | 5/2006 | Brandt .................... H01F 30/10 323/282 |
| 2006/0217907 A1* | 9/2006 | Long ............................. 702/61 |
| 2007/0024255 A1 | 2/2007 | Yasumura |
| 2007/0075698 A1 | 4/2007 | Xi et al. |
| 2008/0309303 A1 | 12/2008 | Morota et al. |
| 2009/0153112 A1 | 6/2009 | Xia et al. |
| 2010/0149842 A1 | 6/2010 | McPhalen et al. |
| 2011/0148202 A1 | 6/2011 | Rada et al. |
| 2013/0015830 A1 | 1/2013 | Zhang |
| 2013/0049471 A1 | 2/2013 | Oleynik et al. |

OTHER PUBLICATIONS

Monteiro, R. et al; EMI Reduction by Optimizing the Output Voltage Rise Time and Fall Time in High-Frequency Soft-Switching Converters—Power Elecronics Specialists Conference 2004.

* cited by examiner

POWER CONVERTER APPARATUS

BACKGROUND OF THE INVENTION

Power converters are used in a wide variety of applications to provide power source to power electronics, charge batteries, and other applications. A typical converter converts a high level direct current (DC) voltage level down to a useable level. Some converters include an alternating current (AC) to DC conversion at the front end of the converter to convert standard AC power service (e.g. 120 VAC) to the high DC, which is then converted down (or up) to the desired level. Some converters are used to provide a stable voltage level, a stable current level, or alternately either a stable voltage or current level, as in the case of many battery chargers.

Conventional power converters are switch mode converters which utilize a converter inductance to regulate the conversion, in conjunction with a switching device to load the conversion inductance and then switch to an output, which is then capacitively filtered to stabilize the output. The conversion inductance can be, for example, a winding on a transformer, or a simple inductor. Examples of switched mode converters that are well known include buck, boost, buck/boost, flyback, push-pull, half bridge, and full bridge converters.

Generally, power converters use a switch transistor connected in series with a conversion inductance to draw current through the conversion inductance by closing the switch transistor (i.e. putting the switch transistor in a saturation state), resulting in energy being stored in a magnetic field of the conversion inductance in response to the current. When the switch transistor is opened (i.e. put into a high impedance state), the energy in the magnetic field is dispersed to the regulated side of the converter where a bulk filter capacitance is generally used to smooth out the energy transfers to an acceptable level. To control the amount of energy being transferred by the conversion inductance the switch transistor is commonly switched using pulse width modulation (PWM) where a substantially squared pulse signal is switched at a particular frequency, and the duty cycle of the pulse width is varied in correspondence with the power demand on the regulated side of the converter.

Since a transistor does not switch instantly from a high impedance state to a low or saturated state, losses occur in the transition between those two states (i.e. through the active and linear regions). Accordingly, the conventional approach to minimizing losses, and to maximize converter efficiency, is to switch as fast as possible. Switching speeds are dependent on the output characteristics of the PWM signal and the switch transistor. As a result of switching the switch transistor as quickly as possible, transients result across the conversion inductance. These transients typically require suppression to comply with governmental conducted and radiated emissions standards. However, the transients often need to be suppressed even more than that required by governmental standards in order to avoid interference with nearby circuitry and other systems. Suppression of transients resulting from switching is typically accomplished by connecting filtering and dissipating components, such as capacitors, resistors, and non-linear steering devices (e.g. diodes) across the conversion inductance. While these components can effectively suppress transients to achieve a desired performance specification regarding conducted and radiated emissions, it is also a source of inefficiency as the power of the transients are being dissipated as heat. In addition to reducing efficiency, the transient handling components add to the manufacturing cost of the converter.

Accordingly, there is a need for a power converter circuit that has reduced transients so that transients do not have to be dissipated and to avoid interfering with nearby devices through conducted or radiated emissions resulting from transients.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
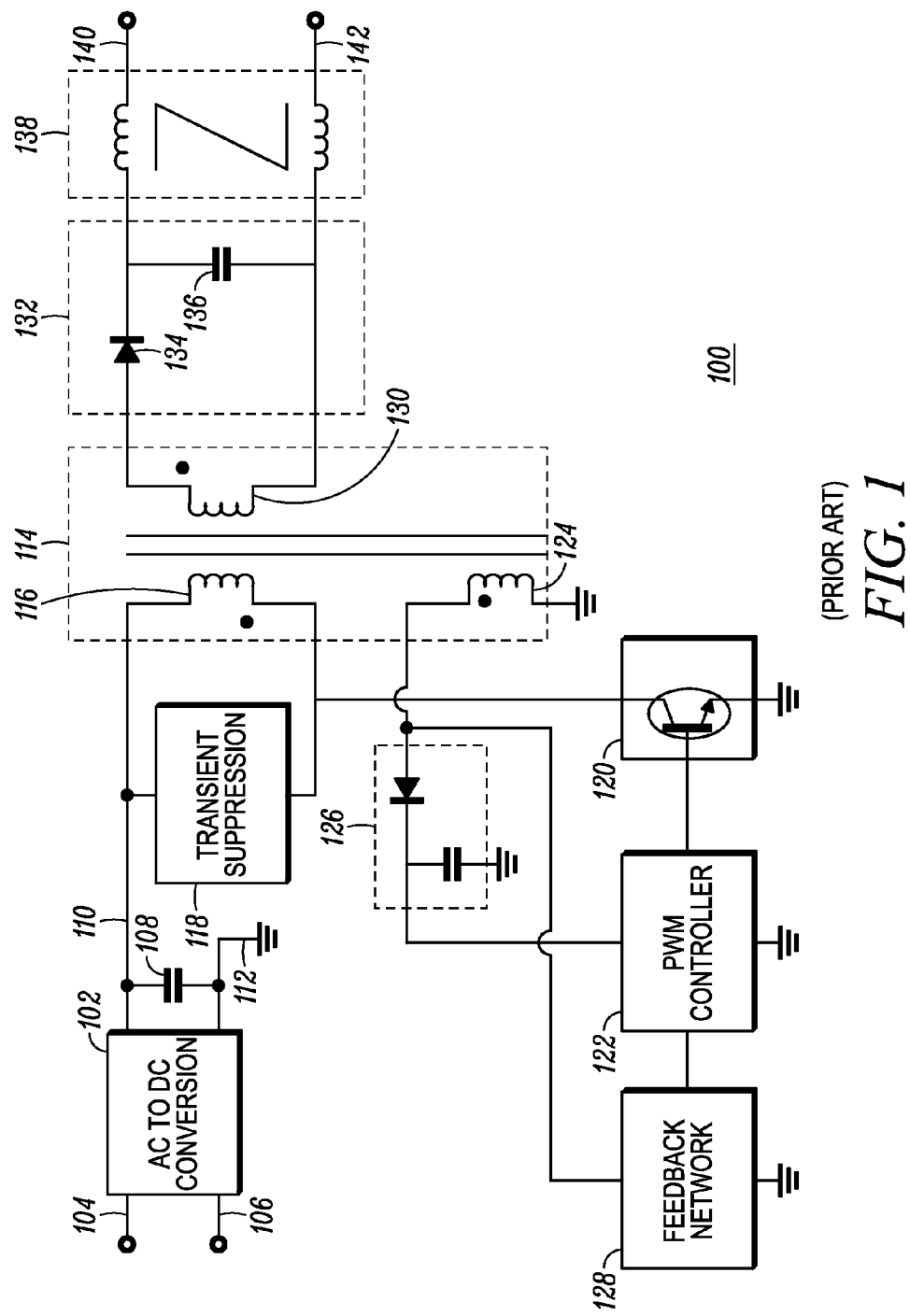
FIG. 1 is a block diagram schematic of a prior art power converter.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments disclosed herein include a power converter circuit that includes a pulse width modulation (PWM) controller that produces a PWM signal in correspondence to a feedback input. The PWM signal operates at a fundamental frequency. A low pass filter is connected to the PWM controller and filters the PWM signal to produce a filtered PWM signal. The low pass filter has a corner frequency that is above at least five times the fundamental frequency of the PWM signal. The power converter further includes a switching transistor that has a control terminal coupled to the low pass filter and is further coupled in series with a primary winding of a transformer.

FIG. 1 is a block diagram schematic of a prior art power converter 100. A typical power converter receives a source voltage from an AC source, such as common commercial electrical service. Accordingly, an AC to DC conversion section 102 is used to rectify and filter an input AC source from lines 104, 106. The AC to DC conversion section 102 contains a rectifier bridge as is known, and outputs a high level, substantially DC voltage level that can be filtered with a bulk capacitance 108. The output between a ground 112 and a positive voltage line 110 will depend on the level of the input AC voltage at lines 104, 106. A transformer 114 is used to isolate the high voltage side from the low voltage side, as is known. The transformer 114 includes a primary winding 116 that operates as the conversion inductance. As used here the term "conversion inductance" refers to the inductive component through which current is switched from a source voltage in order to convert the energy stored in the resulting magnetic field of the inductive component to a regulated voltage or current level in a regulated or secondary side of the power converter circuitry. A switch transistor 120 is used to switch current through the primary winding 116, and is controlled by a PWM controller 122 that provides a pulse width modulated signal to the switch transistor 120. The PWM controller 122 can be powered using an auxiliary winding 124 that will produce an output that can be rectified by a rectifier filter group 126 including a diode and filter capacitor in a conventional configuration. A feedback network 128 is used to sample the output of the auxiliary winding 124 to provide a feedback input to the PWM controller 122. The PWM controller 122 generates the PWM signal in correspondence with the feedback signal to maintain the feedback signal at a desired level which corresponds to a desired output of a secondary winding 130 of the transformer 114, which is sampled using a feedback network 128, such as a resistive voltage divider with appropriate capacitive filtering.

The switching of transistor switch 120, when closed, draws current through the primary winding 116, and when open (after being closed) causes a forward voltage to occur across the secondary winding 130 as the magnetic field in the transformer collapses. The switching results in transients being generated across the primary winding 116. A transient suppression network 118 is connected in parallel with the primary winding 116, and can contain steering diodes to steer transient currents to capacitors that absorb the transient current which are further connected to resistors to dissipate the charge. Because the transients result from the relatively high current through the primary winding being switched off, they tend to be significantly energetic. As a result, the transient suppression network 118 dissipates a significant amount of power which represents an inefficiency. The transients need to be suppressed in order to reduce emitted electrical noise, but also because they can result in voltage levels, if not suppressed, that could damage the switching transistor 120.

A secondary filter 132 rectifies and filters the voltage produced across the secondary winding 130 using, for example, a diode rectifier 134 and filter capacitance 136 to provide an output across lines 140, 142. In addition to the transient suppression network 118, a pair of common mode chokes 138, one on each output line 140, 142, is used to further diminish transients that may otherwise be evident at lines 140, 142. The transient suppression accomplished by transient suppression network 118 and common mode chokes 138 are typically used to meet conducted and radiated electromagnetic emissions levels to comply with governmental regulations. Furthermore, the levels dictated by government regulations may not be sufficiently low to avoid detrimental effects on nearby electronic devices, particularly radio devices such as handheld two radios that are battery powered, and which can use a battery charger powered by the power converter 100. For example, transients generated by switching current through the primary winding 116 can couple into a nearby radio device, reducing the sensitivity of the radio receiver.

Figure 2:
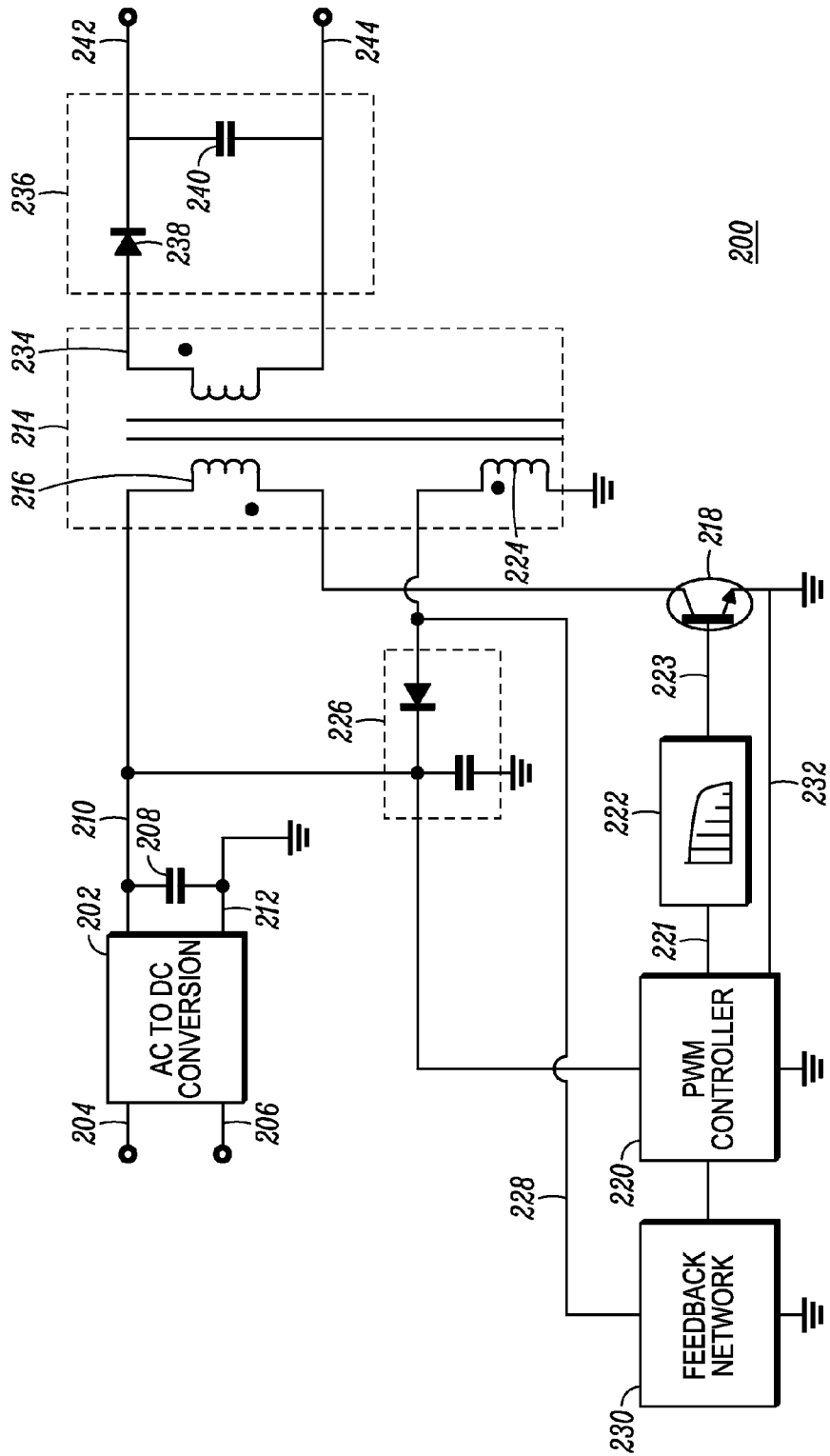
FIG. 2 is a block diagram schematic of a power converter in accordance with some embodiments.

FIG. 2 is a block diagram schematic of a power converter 200 in accordance with some embodiments. The power converter 200 follows the general flyback converter topology, like power converter 100, but avoids the issue of transients by filtering the PWM signal that is used to control switching. An AC to DC conversion section 202 can be used to convert an AC voltage input on lines 204, 206 to a high DC level that is filtered by a bulk filter capacitance 208 between line 210 and ground 212. A conversion transformer 214 contains a primary winding 216, secondary winding 234, and an auxiliary winding 224 on the primary side. The primary winding 216 is used as the conversion inductance and referred to as an inductive conversion winding. The secondary winding 234 and auxiliary winding 224 are configured to have the opposite polarity of the primary winding 216. The auxiliary winding 224 is used to generate an operating voltage with rectifier circuit 226 (using a standard diode/capacitor arrangement) to power a PWM controller 220. The output of the auxiliary winding 224 is sampled via line 228 at a feedback network 230, which provides a signal to the PWM controller corresponding to the output of the auxiliary winding 224.

The PWM controller 220 outputs a conventional PWM signal on line 221 that is based on the signal provided to the PWM controller 220 by the feedback network 230. The PWM signal is provided to a low pass filter 222 via line 221. The low pass filter 222 filters higher harmonics of the switching frequency of the PWM signal to produce a filtered PWM signal on line 223 that is coupled to the switch transistor 218 used to switch current through the primary winding 216, which can be sensed via line 232 by the PWM controller 220. Examples of low pass filters include Butterworth and Chebychev filters. The switch transistor can be any sufficient transistor, including a bipolar junction transistor, a field effect transistor (FET), or a metallic oxide semiconductor field effect transistor (MOSFET). The low pass filter 222 suppresses or attenuates harmonics of the PWM signal 221, or at least higher order harmonics in a particular range. Very high harmonics may be of such low magnitude that attenuation is not needed, depending on the particular application. Accordingly, the low pass filter 222 could be implemented as a notch filter that attenuates harmonics of the PWM signal above a first particular harmonic, up to a very high harmonic where the natural magnitude of harmonics above the very high harmonic are naturally so low as to be of no substantial concern. Thus, the fundamental frequency of the PWM and at least the second harmonic present (which may be the first odd harmonic, i.e. at three times the fundamental frequency) are below a corner or "cut off" frequency of the low pass filter 222. The corner frequency is the point in the frequency response of the low pass filter 222 that defines the roll off, where the attenuation of the low pass filter 222 increases as frequency increases. In some embodiments, the corner frequency can be selected to be above at least a second harmonic, and in some embodiments the corner frequency can be selected to be at five or ten times the fundamental frequency of the PWM signal. In some embodiments, the low pass filter 222 can have at least two, at least three poles, or four or five poles. Each additional pole increases the roll off (rate of change over frequency) of the filter attenuation above the corner frequency by approximately 10 dB per decade (order of magnitude of frequency). Thus, a two pole or second order filter has a roll off of 20 dB per decade, and three pole or third order filter has a roll off of 30 dB per decade, and so on. In some embodiments the low pass filter 222 can be a fourth or fifth order Chebyshev filter having a corner frequency at a frequency above a tenth harmonic frequency of the PWM signal such that harmonic content of the PWM signal above the tenth harmonic frequency is outside a passband of the low pass filter 222. Such a filter will allow substantially 99% of the harmonic content to pass through the filter to the switching transistor 218. It is desirable to have a steep roll off, on the order of 10 dB per decade. In some embodiments the low pass filter 222 can be integrated with the PWM controller 220 in the same package. In some embodiments the filter components (inductors, capacitors) can be adjustable or tunable. While attenuating some of the higher harmonic content can slightly reduce the efficiency of switching the switching transistor 218 as it will spend slightly more time in the active and linear regions, the transients that occur in power converter 100 across primary winding 116 are not evident across primary winding 216 in power converter 200. Accordingly, power converter 200 lacks a transient suppression network, such as transient suppression network 118, and does not significantly lose efficiency because of the lack of dissipation in a transient suppression network as occurs in the prior art.

The output of the secondary winding 234 is filtered by a rectifier filter 236 that includes a rectifier diode 238 and filter capacitance 240 to produce a regulated output between lines 242, 244. Since the transients produced by the higher level harmonic content of the PWM signal are eliminated, and not evident at the primary winding 216, no common mode choke is necessary on lines 242, 244 as in power converter 100. While the low pass filter 222 represents an addition of components, the lack of a transient suppression network across the primary winding 216 and the lack of need for a common mode choke on lines 242, 244 can more than make up for the cost of adding the low pass filter 222. By properly designing the low pass filter 222, the small increase in switching losses in switch transistor 218 can be comparable to, if not less than, the losses resulting from transient suppression across the primary winding 216, and common mode chokes on lines 242, 244. However, the attenuation of higher level harmonics of the fundamental switching frequency can substantially reduce the radiated and conducted emissions to a level significantly lower than that achieved using the transient suppression network 118 and common mode chokes 138, of power converter 100. Thus, power converter 200 improves receiver performance of a nearby radio device compared to that achievable with power converter 100.

Figure 3:
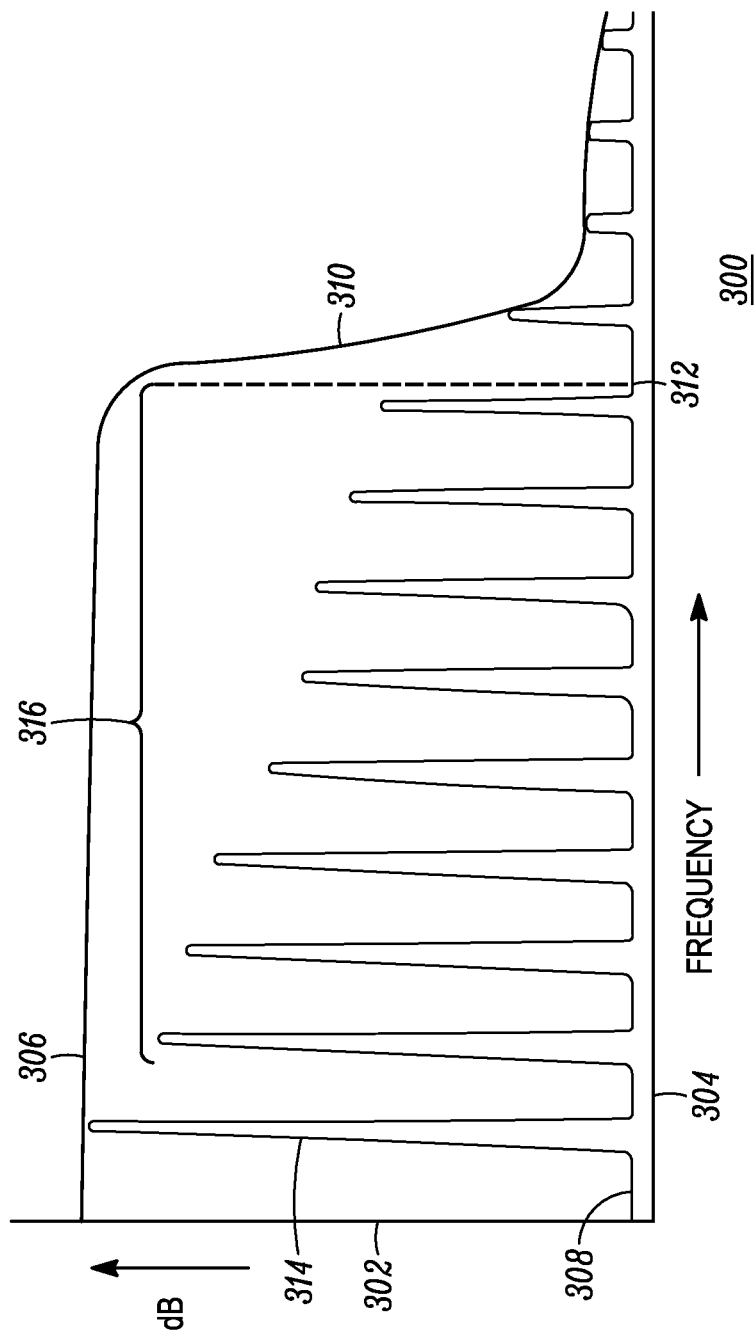
FIG. 3 is a graph chart of a low pass filter for use in a power converter circuit in accordance with some embodiments.

FIG. 3 is a graph chart 300 of the frequency response 306 of a low pass filter for use in a power converter circuit in accordance with some embodiments, and an exemplary PWM signal 308 in the frequency domain. The responses drawn here are meant to be exemplary of the principle involved, and are not meant to necessarily be to scale. The vertical axis 302 represents magnitude in decibels (dB), increasing from bottom to top, and the horizontal axis 304 represents frequency, increasing from left to right. The filter response 306 has a generally flat response across frequency up to a corner frequency 312, where the response begins to roll off 310. The PWM signal 308 contains a fundamental frequency 314, and several harmonics 316 in the passband of filter response 306 (i.e. below the corner frequency). Harmonics above the passband of the filter response 306 are substantially attenuated.

Figure 4:
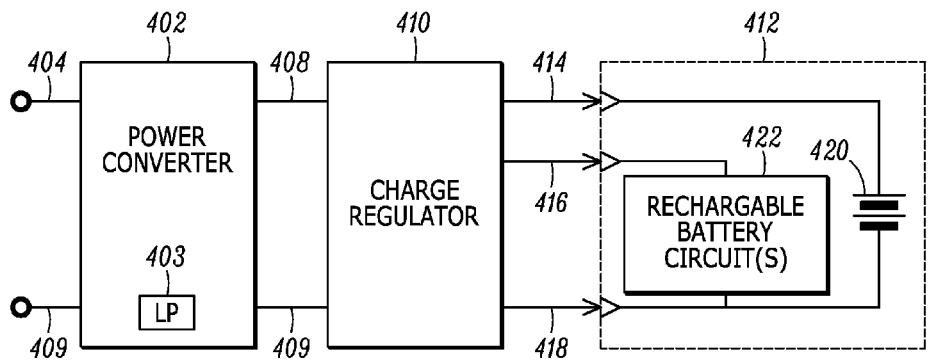
FIG. 4 is a block diagram schematic of a battery charger in accordance with some embodiments.

FIG. 4 is a block diagram schematic of a battery charger 400 in accordance with some embodiments. The battery charger 400 is used to recharge a battery, such as, for example, the battery used to power a portable two way radio or other radio device. The battery charger includes a power converter 402, which can be designed in accordance with the teachings of power converter 200 in FIG. 2, or an alternate topology also using a low pass filter 403 to filter the PWM signal between the PWM controller and the switching transistor. The power converter 402 converts an input, such as a commercial AC service, on lines 404, 406, to a regulated DC level between lines 408, 409 which is provided to a charger regulator 410. The charge regulator 410 controls current and voltage to a rechargeable battery 412. The rechargeable battery 412 includes one or more rechargeable battery cells 420, and can further include one or more circuits 422 (e.g. memory, thermistor, etc.). The charge regulator 410 can connect to the battery 412 via a positive line 414, a negative line 418, and an information line 416 (if circuit 422 is present). The lines 414, 416, 418 can terminate at conductive contacts that make physical contact with corresponding contacts on the battery 412. Upon detecting the battery, the charge regulator 410 can commence applying a charger regime to the battery, such as, for example, a constant current regime, constant voltage regime, or constant current/constant voltage regime, as are well known. The charger regulator can include a controller, such as a microprocessor, that operates circuitry of the charge controller to ensure proper charging of the battery 412. The charger regulator 410 can further include a low level DC to DC regulator, such as a buck regulator. The regulated output of the power converter 402 on lines 408, 409, can be further regulated to provide the desired charger current/voltage to the battery 412.

Figure 5:
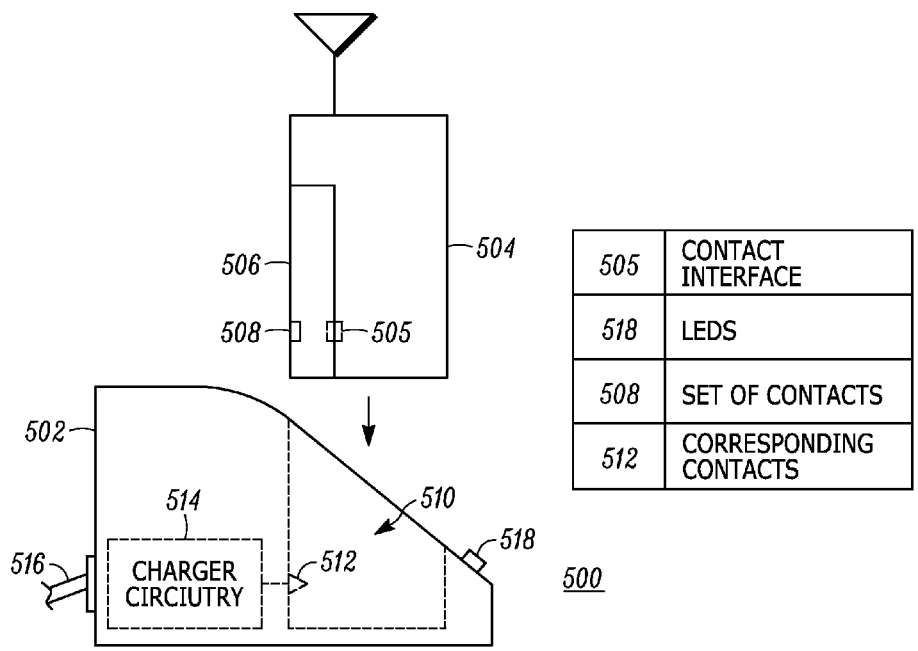
FIG. 5 is a side view of a battery charger and mobile radio device with a battery in accordance with some embodiments.

FIG. 5 is a side view of a system 500 including a battery charger 502 and portable radio device 504 with a battery 506 in accordance with some embodiments. The rechargeable battery 506 can be attached to the portable radio device 504 power the portable radio device at a contact interface 505 between the portable radio device 504 and the attached battery 506. The portable radio device can be, for example, a portable two way radio such as that used by public safety personnel (e.g. fire, police, rescue). The battery 506 includes a set of contacts 508 that mate with corresponding contacts 512 of the charger 502. The charger is formed of a housing having a pocket 510 into which the portable radio 504 can be inserted with the attached battery 506. The battery contacts 508 will, upon insertion, mate with charger contacts 512, allowing the charger circuitry 514 to detect the presence of the battery 506 and commence charging the battery using a power converter that has a low pass filter such as that shown in FIGS. 2-3 to filter a PWM signal to produce a filtered PWM signal that controls a switch transistor for regulating charge current and/or voltage provided to the battery 506. The battery charger 502 can be powered by conventional AC power 516 which is used to generate a DC source that is in turn used to generate a regulated charger current and/or voltage. While charging, the battery charger 502 can illuminate one or more light emitting diodes (LEDs) 518 to indicate a charging status of the battery 506. Because the battery charger 502 uses a power converter formed and operating in accordance with the various embodiments that herein, having a low pass filter between the PWM controller and the switch transistor to filter out higher frequency harmonic content of the PWM signal, no transient suppression/dissipation circuitry is necessary as would be conventional, and the portable radio device 504 experiences less receiver sensitivity degradation over conventional approaches.

Figure 6:
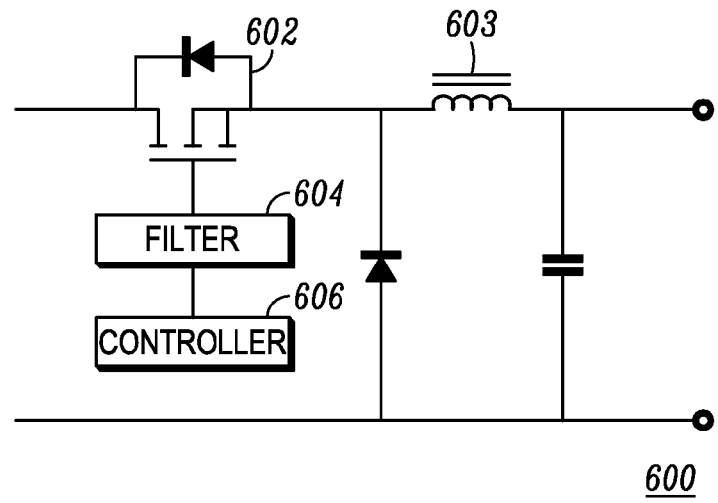
FIG. 6 shows a schematic diagram of a DC to DC converter using a buck topology in accordance with some embodiments.
Figure 7:
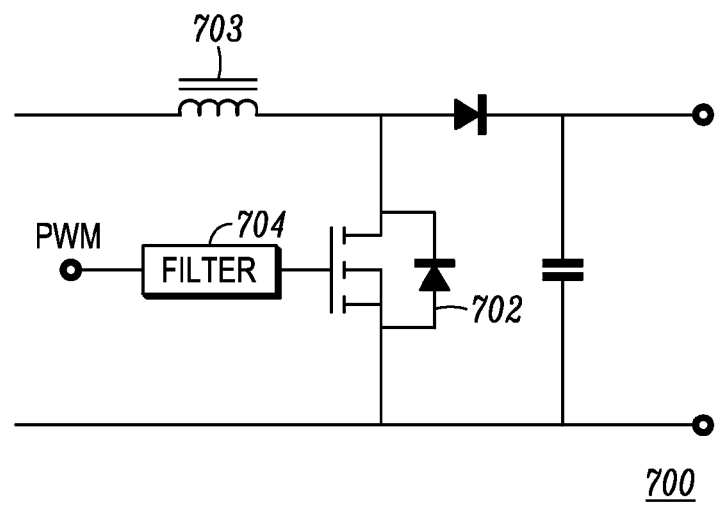
FIG. 7 shows a schematic diagram of a DC to DC converter using a boost topology in accordance with some embodiments.

FIG. 6 shows a schematic diagram of a DC to DC converter using a buck topology 600 in accordance with some embodiments. FIG. 7 shows a schematic diagram of a DC to DC converter using a boost topology 700 in accordance with some embodiments. FIGS. 6-7 show two examples of the several common varieties of switched mode power converter topologies. It will be appreciated by those skilled in the art that the teachings herein are equally applicable to other topologies such as, for example, push-pull, half bridge, and full bridge topologies. In FIG. 6 a switch transistor 602 is used to switch current through a buck conversion inductance 603. The switch transistor 602 is driven by a filtered PWM signal produced by a low pass filter 604 which filters a PWM signal provided by a PWM controller 606. The low pass filter 604 filters (attenuates) higher frequency harmonics of the PWM signal. In FIG. 7 a switch transistor 702 is used to switch current through a boost conversion inductance 703. The switch transistor 702 is driven by a filtered PWM signal produced by a low pass filter 704 which filters a PWM signal provided by a PWM controller. The low pass filter 704 filters (attenuates) higher frequency harmonics of the PWM signal.

Embodiments as taught herein provide the benefit of reducing if not substantially eliminating transients in switched mode power converters that are typically evident across the main conversion inductance without significantly reducing the efficiency of the power converter. The transients are reduced to such an extent that no transient suppression elements are needed across the conversion inductance or on the output of the converter. This benefit is accomplished by using a low pass filter between the PWM controller and the transistor switch used to draw current through the conversion inductance. The low pass filter attenuates higher level harmonics of the PWM signal's fundamental frequency so that most of the harmonic content, by power, is still present in the filtered PWM signal, but the higher frequency harmonic components are eliminated, and thus not amplified through the switching transistor as is conventional (and requiring suppression networks across the conversion inductance). This has the benefit of reducing the cost of the power converter as well as having less effect due to electromagnetic coupling of transient noise into nearby electronic and radio devices. Accordingly, the disclosed embodiments are particularly useful for battery chargers which are used to charge a battery attached to a portable radio device such as a two way radio device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:
1. A power converter, comprising:
a pulse width modulation (PWM) controller that produces a PWM signal in correspondence to a feedback input, the PWM signal having a fundamental frequency;

a low pass filter, having a plurality of poles, connected to the PWM controller, the low pass filter having a corner frequency that is above at least ten times the fundamental frequency of the PWM signal, the low pass filter producing a filtered PWM signal having substantially 99 percent of harmonic content, by power, in the filtered signal with higher frequency harmonic components eliminated; and a switching transistor having a control terminal coupled to the low pass filter to receive the filtered PWM signal having the harmonic content, the switching transistor further coupled in series with a primary winding of a transformer responsive to the filtered PWM signal; and wherein the number of poles for the plurality of poles of the low pass filter being based on:
sufficient attenuation needed to eliminate interference of unwanted harmonics;
sufficient attenuation needed eliminate interference across the primary winding; and
without the use of a transient suppression network.

2. The power converter of claim 1, wherein the low pass filter has at least two poles.

3. The power converter of claim 1, wherein harmonic content of the PWM signal above a tenth harmonic of the fundamental frequency of the PWM signal is outside a passband of the low pass filter.

4. The power converter of claim 1, wherein the low pass filter has a roll off of at least 20 dB per decade.

5. The power convertor of claim 1, wherein the low pass filter filters harmonic content of the PWM signal based on the corner frequency of the low pass filter to produce the filtered PWM signal.

6. The power converter of claim 1, wherein the plurality of poles of the low pass filter comprises at least five poles.

7. The power converter of claim 1, wherein no RF shielding is required in minimizing emissions.

8. The power converter of claim 1, wherein the power converter maintains efficiency while eliminating harmonic interference at radio receiver frequencies.

9. A pulse width modulation (PWM) control circuit, comprising:
a PWM controller that generates a PWM signal having a fundamental frequency and having a duty cycle that is varied in correspondence with an input signal provided to the PWM controller;
a low pass filter, having a plurality of poles, coupled to the PWM controller, the low pass filter having a corner frequency that is above at least ten times the fundamental frequency of the PWM signal, wherein the low pass filter filters the PWM signal based on the corner frequency to produce a filtered PWM signal, the low pass filter producing a filtered PWM signal having substantially 99 percent of harmonic content, by power, in the filtered signal with higher frequency harmonic components minimized;
a switch transistor having a control terminal coupled to the low pass filter to receive the filtered PWM signal, and the switch transistor further controls current through an inductive conversion winding responsive to the filtered PWM signal; and
wherein the number of poles of the plurality of poles of the low pass filter are based on:
sufficient attenuation needed to minimize interference of higher frequency harmonics in the filtered signal;
sufficient attenuation needed minimize interference across the primary winding; and
without the use of a transient suppression network.

10. The PWM control circuit of claim 9, wherein the inductive conversion winding is a primary winding of a conversion transformer and the switch transistor is a field effect transistor or a bipolar transistor.

11. The PWM control circuit of claim 9, wherein the low pass filter has at least three poles.

12. The PWM control circuit of claim 9, wherein harmonic content of the PWM signal above a tenth harmonic of the fundamental frequency of the PWM signal is outside a passband of the low pass filter.

13. The PWM control circuit of claim 9, wherein the low pass filter has a roll off of at least 20 dB per decade.

14. The PWM control circuit of claim 9, wherein the low pass filter is a fourth order Chebyshev filter having a corner frequency at a frequency above a tenth harmonic frequency of the PWM signal such that harmonic content of the PWM signal above the tenth harmonic frequency is outside a passband of the filter.

15. The PWM control circuit of claim 9, wherein the low pass filter filters harmonic content of the PWM signal based on the corner frequency of the low pass filter to produce the filtered PWM signal.

16. The PWM control circuit of claim 9, wherein the plurality of poles of the low pass filter comprises at least five poles.

17. The PWM control circuit of claim 9, wherein no RF shielding is required in minimizing emissions.

18. The PWM control circuit of claim 9, wherein the PWM control circuit maintains efficiency while eliminating harmonic interference at radio receiver frequencies.

19. The PWM control circuit of claim 9, wherein the attenuation of higher frequency harmonics of the fundamental frequency substantially reduces radiated and conducted emissions.

20. A battery charger, comprising:
a housing having a charging pocket configured to accept a portable radio device with an attached battery;
a charge regulator that provides a regulated charging current or voltage to the attached battery from a DC source;
a switched mode power converter that converts an input AC to the DC source used by the charge regulator, the switched mode power converter having a pulse width modulation (PWM) controller, a conversion inductance, a switch transistor, and a low pass filter coupled between the PWM controller and the switch transistor, wherein the low pass filter has a plurality of poles and a corner frequency that is above at least a ten times the fundamental frequency of a PWM signal produced by the PWM controller, and the low pass filter filters the PWM signal based on the corner frequency to produce a filtered PWM signal having substantially 99 percent of harmonic content, by power, in the filtered signal with higher frequency harmonic components eliminated;
wherein the switch transistor switches current through the conversion inductance responsive to the filtered PWM signal produced by the low pass filter; and
wherein the number of poles for the plurality of poles of the low pass filter being based on:
sufficient attenuation needed to eliminate interference of higher frequency harmonics in the filtered signal;
sufficient attenuation needed eliminate interference across the primary winding; and
without the use of a transient suppression network.

21. The battery charger of claim 20, wherein the conversion inductance is a primary winding of a conversion transformer and the switch transistor is a bipolar junction transistor.

22. The battery charger of claim 20, wherein harmonic content of the PWM signal above a tenth harmonic of the fundamental frequency of the PWM signal is outside a passband of the low pass filter.

23. The battery charger of claim 20, wherein the low pass filter has a roll off of at least 10 dB per decade.

24. The battery charger of claim 20, wherein the low pass filter is a fourth order Chebyshev filter having a corner frequency at a frequency above a tenth harmonic frequency of the PWM signal such that harmonic content of the PWM signal above the tenth harmonic frequency is outside a passband of the filter.

25. The battery charger of claim 20, wherein the low pass filter filters harmonic content of the PWM signal based on the corner frequency of the low pass filter to produce the filtered PWM signal.

26. The battery charger of claim 20, wherein the plurality of poles of the low pass filter comprises at least five poles.

27. The battery charger of claim 20, wherein no RF shielding is required in minimizing emissions.

28. The battery charger of claim 20, wherein the switched mode power converter maintains efficiency while eliminating harmonic interference at radio receiver frequencies.

29. A power converter, comprising:

a pulse width modulation (PWM) controller that produces a PWM signal in correspondence to a feedback input, the PWM signal having a fundamental frequency;

a low pass filter connected to the PWM controller, the low pass filter having a corner frequency above the fundamental frequency of the PWM signal so as to produce a filtered PWM signal having substantially 99 percent of harmonic content, by power, in the filtered signal with higher frequency harmonic components eliminated, and the low pass filter having a plurality of poles, the plurality of poles attenuating interference of unwanted harmonics in the filtered signal; and a switching transistor having a control terminal coupled to the low pass filter to receive the filtered PWM signal having the harmonic content, the switching transistor further coupled in series with a primary winding of a transformer responsive to the filtered PWM signal; and the plurality of poles of the low pass filter further providing attenuation to eliminate interference across the primary winding without the use of a transient suppression network.

* * * * *